(12) United States Patent
Terada et al.

(10) Patent No.: US 7,846,258 B2
(45) Date of Patent: Dec. 7, 2010

(54) CLEANING SHEET AND METHOD OF CLEANING SUBSTRATE PROCESSING EQUIPMENT

(75) Inventors: Yoshio Terada, Ibaraki (JP); Makoto Namikawa, Ibaraki (JP); Eiji Toyoda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 103 days.

(21) Appl. No.: 10/535,842

(22) PCT Filed: Nov. 10, 2003

(86) PCT No.: PCT/JP03/14261
§ 371 (c)(1),
(2), (4) Date: Feb. 14, 2006

(87) PCT Pub. No.: WO2004/048008
PCT Pub. Date: Jun. 10, 2004

(65) Prior Publication Data
US 2006/0151004 A1 Jul. 13, 2006

(30) Foreign Application Priority Data
Nov. 25, 2002 (JP) ............................ P.2002-340935
Nov. 25, 2002 (JP) ............................ P.2002-340936
Jan. 28, 2003 (JP) ............................ P.2003-018151

(51) Int. Cl.
*B08B 7/00* (2006.01)
*B08B 7/12* (2006.01)

(52) U.S. Cl. ........................... 134/6; 134/42; 428/40.1; 428/343; 15/104.002

(58) Field of Classification Search .................... 134/6, 134/42; 15/104.002; 428/40.1, 343
See application file for complete search history.

(56) References Cited

U.S. PATENT DOCUMENTS

| 6,277,457 B1 * | 8/2001 | Onishi et al. ................ 428/40.1 |
| 6,618,890 B2 * | 9/2003 | Muhr-Sweeney ...... 15/104.002 |
| 2002/0042962 A1 * | 4/2002 | Willman et al. ................ 15/208 |

FOREIGN PATENT DOCUMENTS

| JP | 8-88206 A | 4/1996 |
| JP | 2001-300436 A | 10/2001 |
| JP | 2002-23143 A | 1/2002 |
| JP | 2002-214576 A | 7/2002 |
| JP | 2002-239476 | 8/2002 |
| JP | 2002-327156 A | 11/2002 |
| WO | WO 02/083332 A1 | 10/2002 |

OTHER PUBLICATIONS

Communication from Japanese Patent Office dated Jun. 5, 2007.
Communication from Japanese Patent Office (6 pages).

* cited by examiner

*Primary Examiner*—Michael Barr
*Assistant Examiner*—Saeed T Chaudhry
(74) *Attorney, Agent, or Firm*—Sughrue Mion, PLLC

(57) ABSTRACT

A cleaning sheet comprises a cleaning layer provided on one side of a base material, from which cleaning layer $F^-$, $Cl^-$, $Br^-$, $NO_2^-$, $NO_3^-$, $PO_4^{3-}$, $SO_4^{2-}$, $Na^+$, $NH_4^+$ and $K^+$ are extractable with pure water each in an amount of not greater than 20 ppm, when extracted under boiling at 120° C. for 1 hour, and a pressure-sensitive adhesive layer provided on the other side of the base material, a carrying material with cleaning capacity comprising the aforementioned cleaning sheet laminated on a carrying material with a pressure-sensitive adhesive layer. The present disclosure also relates to a method for cleaning a substrate processing equipment which comprises conveying the aforementioned carrying material with cleaning capacity into the substrate processing equipment.

14 Claims, No Drawings

CLEANING SHEET AND METHOD OF CLEANING SUBSTRATE PROCESSING EQUIPMENT

TECHNICAL FIELD

The present invention relates to a sheet for cleaning various substrate processing equipments which are easily affected by foreign matters such as equipments for producing or examining semiconductor, flat panel display, print circuit board, etc., a method of cleaning a substrate processing equipment using such a sheet and a substrate processing equipment cleaned by such a cleaning method.

BACKGROUND ART

In various substrate processing equipments, various conveyance systems and substrates are conveyed in physical contact with each other. During this procedure, when the substrates or conveyance systems have foreign matters attached thereto, the subsequent substrates are sequentially contaminated. This makes it necessary that the operation of the equipment be regularly suspended for cleaning, causing the drop of operating efficiency or requiring much labor.

In order to solve these problems, a method which comprises conveying a substrate having a tacky material fixed thereto to remove foreign matters attached to the interior of the substrate processing equipment through cleaning (Patent Reference 1) and a method which comprises conveying a tabular member to remove foreign matters attached to the back surface of a substrate (Patent Reference 2) have been proposed. These methods eliminate the necessity of suspending the operation of the substrate processing equipment for cleaning, causing no drop of operating efficiency or requiring no much labor. In particular, the former method is superior in the capacity of removing foreign matters.

[Patent Reference 1]
JP-A-10-154686 (pp. 2-4)
[Patent Reference 2]
JP-A-11-87458 (pp. 2-3)

DISCLOSURE OF THE INVENTION

However, the inventors' studies show that the aforementioned proposals are disadvantageous in that when the cleaning member conveyed into the equipment contains anions such as halogen ion, nitrate ion, phosphate ion and sulfate ion or cations such as alkali metal ion, these ionic impurities can contaminate the interior of the equipment, causing the contamination of product wafers resulting in serious problems such as corrosion of device wiring and deterioration of transistor performance.

Further, in accordance with the aforementioned proposals, particularly the former method having an excellent removing capacity of foreign matters, i.e., method involving the use of a tacky material, the surface of cleaning layer is laminated with a releasable protective film obtained by subjecting a polyester film or the like to treatment for easy release with silicone, wax or the like or by forming a polyolefin-based resin or the like impregnated with a heat deterioration inhibitor, a lubricant or the like into a film to inhibit the contamination thereof.

The inventors found that such a protective film contains as impurities various metal elements such as alkali metal and alkaline earth metal or compounds thereof that can be transferred to the cleaning layer. When the cleaning member is conveyed into the substrate processing equipment with this protective film peeled off the cleaning layer, the adhesion of these impurities makes the equipment contaminate, resulting in the contamination of product wafers that causes frequent occurrence of defectives due to deterioration of device performance.

Further, the inventors' studies show that the aforementioned proposals are disadvantageous in that when the cleaning member to be conveyed into the equipment contains, as the impurities, metal such as alkali metal and alkaline earth metal or compounds thereof, it not only makes the desired cleaning effect impossible but also causes these impurities to contaminate the interior of the equipment, causing the contamination of product wafers resulting in serious problems such as corrosion of device wiring and deterioration of transistor performance.

An aim of the invention is to provide a cleaning member which causes no contamination of a substrate processing equipment by ionic impurities in the removal of foreign matters attached to the interior of the equipment through cleaning by the conveyance thereof into the equipment in the light of these circumstances.

Another aim of the invention is to provide a cleaning member which causes little contamination of a substrate processing equipment by metal impurities attributed to a protective film in the removal of foreign matters attached to the interior of the equipment through cleaning by the conveyance thereof into the equipment in the light of these circumstances.

A further aim of the invention is to provide a cleaning member which causes no contamination of a substrate processing equipment by metal impurities in the removal of foreign matters attached to the interior of the equipment through cleaning by the conveyance thereof into the equipment in the light of these circumstances.

The inventors made extensive studies of accomplishment of the aforementioned aims. As a result, a knowledge was obtained that the use of a cleaning member comprising a cleaning layer adapted to come in contact with the substrate processing equipment the pure water extractability of specific ions of which is limited in the removal of foreign matters attached to the interior of the equipment through cleaning by the conveyance of the cleaning member into the interior of the equipment makes it possible to eliminate contamination of the equipment by ionic impurities and hence prevent the occurrence of serious problems such as contamination of product wafer that causes corrosion of wiring in the device or deterioration of transistor performance. The invention has thus been worked out.

In other words, the invention concerns a cleaning sheet comprising a cleaning layer from which $F^-$, $Cl^-$, $Br^-$, $NO_2^-$, $NO_3^-$, $PO_4^{3-}$, $SO_4^{2-}$, $Na^+$, $NH_4^+$ and $K^+$ are extractable with pure water each in an amount of not greater than 20 ppm (as extracted under boiling at 120° C. for 1 hour) and particularly a cleaning sheet having the aforementioned constitution wherein the cleaning layer has substantially no adhesion or a cleaning sheet having the aforementioned constitution wherein the cleaning layer is provided on a base material. The invention further concerns a method for cleaning a substrate processing equipment which comprises conveying such a cleaning sheet into the substrate processing equipment.

The inventors also obtained a knowledge that the use of a protective film formed by a material from which metal elements or compounds thereof are transferred to a silicon wafer each in an amount of not greater than a specific value as calculated in terms of metal element when the protective film is brought into contact with (the mirror surface of) the silicon wafer as a protective film provided on the cleaning layer in the removal of foreign matters attached to the interior of the substrate processing equipment through cleaning by the conveyance of the cleaning member into the interior of the equipment makes it possible to eliminate contamination of the equipment by metal impurities and hence prevent the occurrence of problems such as contamination of product wafer that causes frequent occurrence of defectives due to deterioration of device performance. The invention has thus been worked out.

In other words, the invention concerns a cleaning sheet comprising a releasable protective film laminated on a cleaning layer, wherein the protective film is formed by a material from which metal elements such as Na, K, Ca, Mg, Al, Ti, Cr, Mn, Fe, Co, Ni, Cu and Zn or compounds thereof are transferred to a silicon wafer each in an amount of not greater than $1 \times 10^{12}$ atoms/cm$^2$ as calculated in terms of metal element when the protective film is brought into contact with (the mirror surface of) the silicon wafer at 23° C. for 1 minute and more particularly a cleaning sheet having the aforementioned constitution wherein the cleaning layer has substantially no adhesion or a cleaning sheet having the aforementioned constitution wherein the cleaning layer is provided on a base material. The invention further concerns a method for cleaning a substrate processing equipment which comprises conveying such a cleaning sheet into the substrate processing equipment with the protective film peeled off the cleaning layer.

The inventors further obtained a knowledge that the use of a cleaning member comprising a cleaning layer adapted to come in contact with the substrate processing equipment the content of specific metal elements or compounds thereof of which is limited in the removal of foreign matters attached to the interior of the equipment through cleaning by the conveyance of the cleaning member into the interior of the equipment makes it possible to eliminate contamination of the equipment by metal impurities and hence prevent the occurrence of serious problems such as contamination of product wafer that causes corrosion of wiring in the device or deterioration of transistor performance. The invention has thus been worked out.

In other words, the invention concerns a cleaning sheet comprising a cleaning layer containing metal elements such as Na, K, Mg, Al, Ca, Ti, Cr, Mn, Fe, Co, Ni, Cu and Zn or compounds thereof each in an amount of not greater than 5 ppm (µg/g) as calculated in terms of metal element and more particularly a cleaning sheet wherein the cleaning layer has substantially no adhesion or a cleaning sheet wherein the cleaning layer is provided on a base material. The invention further concerns a method for cleaning a substrate processing equipment which comprises conveying such a cleaning sheet into the substrate processing equipment.

The invention also concerns a cleaning sheet having the aforementioned constitution wherein the cleaning layer is provided on one side of a base material and a pressure-sensitive adhesive layer is provided on the other side of the base material and more particularly a carrying material with cleaning capacity comprising the aforementioned cleaning sheet laminated on a carrying material with a pressure-sensitive adhesive layer. The invention further concerns a method for cleaning a substrate processing equipment which comprises conveying a carrying material with cleaning capacity having the aforementioned constitution into the substrate processing equipment. The invention further concerns a method of cleaning a substrate processing equipment which comprises conveying a carrying material with cleaning capacity having the aforementioned constitution into the substrate processing equipment with a protective film, if any provided on the cleaning sheet, peeled off the cleaning layer.

The invention further can provide a substrate processing equipment cleaned by any of the aforementioned various cleaning methods.

BEST MODE FOR CARRYING OUT THE INVENTION

In the invention, the cleaning layer needs to meet the requirements that the pure water extractability of F$^-$, Cl$^-$, Br$^-$, NO$_2^-$, NO$_3^-$, PO$_4^{3-}$, SO$_4^{2-}$, Na$^+$, NH$_4^+$ and K$^+$ as ionic impurities be each in an amount of not greater than 20 ppm (µg/g), preferably not greater than 10 ppm (as extracted under boiling at 120° C. for 1 hour). When the pure water extractability of specific ions are each not greater than 20 ppm, the contamination of the substrate processing equipment thus cleaned by ionic impurities can be eliminated, making it possible to prevent the occurrence of problems such as contamination of product wafer.

For the measurement of the aforementioned pure water extractability of specific ions, the cleaning layer is cut into a size of 100 cm$^2$ (10 cm×10 cm). The cleaning layer thus sampled is then measured out in a container made of PMP (polymethylpentene). Into the container is then put 50 ml of pure water. The container is then closed. The sample is then extracted under boiling at 120° C. in a dryer for 1 hour. The resulting extract is then subjected to quantitative analysis using a Type DX-500 ion chromatography (produced by DIONEX CORPORATION).

In the invention, the releasable protective film to be laminated on the cleaning layer is formed by a material from which metal elements such as Na, K, Ca, Mg, Al, Ti, Cr, Mn, Fe, Co, Ni, Cu and Zn or compounds thereof are transferred to a silicon wafer each in an amount of not greater than $1 \times 10^{12}$ atoms/cm$^2$, preferably not greater than $1 \times 10^{11}$ atoms/cm$^2$, more preferably not greater than $1 \times 10^{10}$ atoms/cm$^2$ as calculated in terms of metal element when the protective film is brought into contact with (the mirror surface of) the silicon wafer at 23° C. for 1 minute. The use of such a protective film makes it possible to eliminate the contamination of the equipment and hence prevent the contamination of product wafer.

On the contrary, when a protective film formed by a material from which the aforementioned metal elements or compounds thereof are transferred to the silicon wafer each in an amount of greater than $1 \times 10^{12}$ atoms/cm$^2$ as calculated in terms of metal element is used, the aforementioned metal elements or compounds thereof are transferred to the cleaning layer as impurities. Accordingly, when the cleaning sheet is conveyed into the substrate processing equipment with the protective film peeled off the cleaning layer, the impurities which have been transferred are attached (transferred) to the equipment, resulting in the contamination of product wafer that causes deterioration of device performance leading to frequent occurrence of defectives and hence drop of yield to great disadvantage.

For the measurement of the aforementioned transferred amount, the protective film is brought into contact with (the mirror surface of) the silicon wafer at 23° C. for 1 minute. For the measurement of the transferred amount of Na and K, the surface of the wafer which has been brought into contact with the protective film is brought into contact with hydrofluoric acid. The hydrofluoric acid with which the wafer has been brought into contact is heated and evaporated to dryness. The residue is then subjected to inductively coupled plasma mass spectroscopy (using a Type HP4500, produced by Hewlett-Packard Development Company, L.P.).

For the measurement of the transferred amount of Ca, Mg, Al, Ti, Cr, Mn, Fe, Co, Ni, Cu and Zn, the surface of the wafer which has been brought into contact with the protective film is subjected to total reflection X-ray fluorometry (using a Type TREX610T, produced by Technos Inc.).

Further, in the invention, the cleaning layer needs to meet the requirements that the content of metal elements such as Na, K, Mg, Al, Ca, Ti, Cr, Mn, Fe, Co, Ni, Cu, Zn, or compounds thereof as metal impurities be not greater than 5 ppm (μg/g), preferably not greater than 2 ppm, more preferably not greater than 1 ppm as calculated in terms of metal element. By thus limiting the content of metal impurities, the contamination of the substrate processing equipment thus cleaned by metal impurities can be eliminated, making it possible to prevent the occurrence of problems such as contamination of product wafer.

The aforementioned content can be measured in the following manner.

The cleaning layer is cut into a size of 4 cm$^2$ (2 cm×2 cm). The cleaning layer thus sampled is measured out in a platinum dish where it is then heated with a gas burner so that it is combusted. Thereafter, the sample is heated to 550° C. for 1 hour and to 600° C. for 1 hour in an electric oven until no carbon is left uncombusted. The sample is then allowed to cool. To the sample is then added 2 ml of concentrated hydrochloric acid. The sample is then heated to 50° C. so that the ash content is dissolved. The sample is allowed to cool, and then diluted with ultrapure water to make 50 ml. For the determination of the content of each of elements such as Na and K, atomic-absorption spectroscopy is effected (using a Type Z-6100, produced by Hitachi, Ltd.). For the determination of the content of each of elements such as Mg, Al, Ca, Ti, Cr, Mn, Fe, Co, Ni, Cu and Zn, ICP spectroscopy is effected (using a Type SPS-1700HVR, produced by Seiko Instruments Inc.).

When such a cleaning layer has a tensile modulus (testing method: JIS K7127) of not smaller than 10 MPa, preferably from 10 to 2,000 MPa, squeeze-out of the cleaning layer during the cutting of the label or malcutting of the label can be prevented, making it possible to produce a label sheet with cleaning capacity causing no contamination in the precutting process to advantage. When the tensile modulus is too small, the label sheet can be adhered to the contact sites (sites to be cleaned) in the equipment during conveyance, causing conveyance troubles besides the aforementioned cutting troubles. On the contrary, when the tensile modulus is too great, the resulting label sheet has a deteriorated capacity of removing foreign matters attached to the conveyance system.

The material of such a cleaning layer is not specifically limited. However, the cleaning layer is preferably formed by a resin layer which has been polymerized and cured by an active energy source such as ultraviolet rays and heat. This is because the aforementioned polymerization curing gives a three-dimensionally networked molecular structure that shows substantially no adhesion, making it possible to obtain a cleaning member which does not adhere to the contact sites in the substrate processing equipment during conveyance and thus can be securely conveyed into the equipment.

The term "substantially no adhesion" as used herein is meant to indicate that there occurs no pressure-sensitive tack representing adhesion if the essence of tack is regarded as friction, which is resistance to slippage. This pressure-sensitive tack appears when the elastic modulus of the tacky material is up to 1 MPa, according to, e.g., Dahlquist's standard.

An example of the aforementioned polymerization-cured resin layer is one obtained by subjecting a curable resin composition comprising a pressure-sensitive adhesive polymer, a compound having one or more unsaturated double bonds per molecule (hereinafter referred to as "polymerizable unsaturated compound"), a polymerization initiator and optionally a crosslinking agent to curing by an active energy source, particularly by ultraviolet rays.

By limiting the content of the aforementioned specific ions to be contained in the various constituents of the aforementioned curable resin composition, i.e., by properly selecting the material of the various constituents to be used or subjecting the constituents to a proper treatment for reducing the content of the aforementioned specific ions, the pure water extractability of the aforementioned specific ions from the resin layer thus polymerization-cured is predetermined to be not greater than 20 ppm.

Further, by limiting the content of the aforementioned specific metal elements or compounds thereof to be contained in the various constituents of the aforementioned curable resin composition, i.e., by properly selecting the material of the various constituents to be used or subjecting the constituents to a proper treatment for reducing the content of the aforementioned metal elements or compounds thereof, the content of the aforementioned metal elements or compounds thereof in the resin layer thus polymerization-cured are each predetermined to be not greater than 5 ppm as calculated in terms of metal element.

In the case where a protective film described later is laminated on the cleaning layer made of polymerization-cured resin layer, etc., the aforementioned metal elements or compounds thereof can be transferred from the protective film to the interior of the cleaning layer. In this case, in order to limit the transferred amount as well, the content of the aforementioned metal elements or compounds thereof in the cleaning layer are each predetermined to be not greater than 5 ppm as calculated in terms of metal element.

As the pressure-sensitive adhesive polymer there is preferably used an acrylic polymer comprising (meth)acrylic acid and/or (meth)acrylic acid ester as a main monomer. For the synthesis of the acrylic polymer, unsaturated double bonds may be incorporated in the molecule of acrylic polymer by using a compound having two or more unsaturated double bonds per molecule as a copolymerizable monomer or chemically bonding a compound having unsaturated double bonds in its molecule to the acrylic polymer thus synthesized by reaction of functional groups with each other. The incorporation of unsaturated double bonds makes it possible for the acrylic polymer to take part in the polymerization curing reaction.

As the polymerizable unsaturated compound there is preferably used a nonvolatile low molecular compound having a weight-average molecular weight of not greater than 10,000, particularly not greater than 5,000 for high efficiency in three-dimensional networking during curing.

Examples of such a polymerizable unsaturated compound include phenoxypolyethylene glycol (meth)acrylate, ε-caprolactone (meth)acrylate, polyethylene glycol di(meth)acrylate, polypropylene glycol di(meth)acrylate, trimethylolpropane tri(meth)acrylate, dipentaerythritol hexa(meth)acrylate, urethane (meth)acrylate, epoxy (meth)acrylate, and oligoester (meth)acrylate. One or more of them may be used.

As the polymerization initiator there may be used a heat polymerization initiator such as benzoyl peroxide and azobisisobutyronitrile if heat is used as active energy source. Alternatively, if light is used as active energy source, there may be used a photopolymerization initiator such as benzoyl, benzoin ethyl ether, dibenzyl, isopropylbenzoin ether, benzophenone, Michler's ketone chlorothioxanthone, dodecylthioxanthone, dimethyl-thioxanthone, acetophenone diethyl ketal, benzyl dimethyl ketal, α-hydroxycyclohexyl phenyl ketone, 2-hydroxymethyl phenyl propane and 2,2-dimethoxy-2-phenylactophenone.

The cleaning layer formed by the resin layer thus polymerization-cured preferably exhibits a 180° peeling adhesion of not greater than 0.2 N/10 mm width, more preferably from 0.01 to 0.1 N/10 mm width with respect to silicon wafer (mirror surface) (as measured according to JIS Z0237). Such a low tack or non-tacky cleaning layer cannot be adhered to the contact sites in the equipment during conveyance, causing no conveyance troubles.

In the invention, such a cleaning layer may be singly formed into a sheet or tape or may be provided on a proper base material to provide a cleaning sheet of the invention. By conveying the cleaning sheet thus prepared into various substrate processing equipments as it is or while being stuck to a carrying material with a pressure-sensitive adhesive so that the cleaning layer is brought into contact with the sites to be cleaned, foreign matters attached to the sites can be simply and surely removed through cleaning.

Further, in the invention, such a cleaning layer may be singly formed into a sheet or tape or provided on a proper base material, and then laminated with the aforementioned specific protective film to provide a cleaning sheet of the invention. By conveying the cleaning sheet with the aforementioned protective film peeled off the cleaning layer into various substrate processing equipments as it is or while being stuck to the carrying material with a pressure-sensitive adhesive so that the cleaning layer is brought into the sites to be cleaned, foreign matters attached to the sites can be simply and surely removed from the aforementioned sites through cleaning.

A particularly preferred embodiment of the invention is a cleaning sheet comprising a cleaning layer provided on one side of a base material and a pressure-sensitive adhesive layer provided on the other. In this structure, it is preferred that the thickness of the base material, the cleaning layer and the pressure-sensitive adhesive layer be normally from 10 to 100 μm, from 5 to 100 μm and from 5 to 100 μm (preferably from 10 to 50 μm), respectively.

The cleaning sheet thus prepared is then stuck to a carrying material with the pressure-sensitive adhesive layer provided on the other side of the base material to produce a carrying material with cleaning capacity. By conveying the carrying material into various substrate processing equipments in the same manner as mentioned above so that the cleaning layer is brought into contact with the sites to be cleaned, foreign matters attached to the sites can be simply and surely removed through cleaning.

Another particularly preferred embodiment of the invention is a cleaning sheet comprising a cleaning layer provided on one side of a base material, the aforementioned specific protective film laminated on the cleaning layer and a pressure-sensitive adhesive layer provided on the other. In this embodiment, it is preferred that the thickness of the base material, the cleaning layer and the pressure-sensitive adhesive layer be normally from 10 to 100 μm, from 5 to 100 μm and from 5 to 100 μm (preferably from 10 to 50 μm), respectively.

The cleaning sheet thus prepared is then stuck to a carrying material with the pressure-sensitive adhesive layer provided on the other side of the base material to provide a carrying material with cleaning capacity. By conveying the carrying material into various substrate processing equipments with the aforementioned protective film peeled off the cleaning layer so that the cleaning layer is brought into contact with the sites to be cleaned, foreign matters attached to the sites can be simply and surely removed through cleaning.

The material of the base material is not specifically limited but may be a plastic film made of a polyolefin such as polyethylene, polypropylene, polybutene, polybutadiene and polymethyl pentene or resin such as polyvinyl chloride, vinyl chloride copolymer, polyethylene terephthalate, polybutylene terephthalate, polyurethane, ethylene-vinyl acetate copolymer, ionomer resin, ethylene-(meth)acrylic acid copolymer, ethylene-(meth)acrylic acid ester copolymer, polystyrene and polycarbonate.

Such a plastic film may be a single-layer film or laminated film made of the aforementioned resin. The plastic film may be subjected to surface treatment such as corona treatment on one or both sides thereof.

The constituents of the pressure-sensitive adhesive layer provided on the other side of the base material are not specifically limited. Any of materials comprising a normal pressure-sensitive adhesive such as acrylic and rubber-based pressure-sensitive adhesives may be used. Among these pressure-sensitive adhesives, a material mainly composed of an acrylic polymer comprising components having a weight-average molecular weight of not greater than 100,000 in a proportion of not greater than 10% by weight obtained by the polymerization reaction of a monomer mixture of (meth)acrylic acid alkyl ester and optionally other copolymerizable monomers is preferably used as an acrylic pressure-sensitive adhesive.

Such a pressure-sensitive adhesive layer exhibits a 180° peeling adhesion of from 0.01 to 10 N/10 mm width, preferably from 0.05 to 5 N/10 mm width with respect to silicon wafer (mirror surface). When the adhesion is too high, it is likely that the base material film can be torn when the cleaning sheet is peeled off the carrying material.

The surface of the cleaning layer may keep the protective film stuck thereto until the cleaning sheet is used. The material of the protective film is not specifically limited. For example, a plastic film having a thickness of normally from 10 to 100 μm made of polyolefin such as polyethylene, polypropylene, polybutene, polybutadiene and polymethylpentene or resin such as polyvinyl chloride, vinyl chloride copolymer, polyethylene terephthalate, polybutylene terephthalate, polyurethane, ethylene-vinyl acetate copolymer, ionomer resin, ethylene-(meth)acrylic acid copolymer, ethylene(meth)acrylic acid ester copolymer, polystyrene and polycarbonate which has been subjected to release treatment with a silicone-based, long-chain alkyl-based, fluorine-based, aliphatic acid amide-based or silica-based release agent is used.

The amount of the aforementioned metal elements or compounds thereof to be transferred from the protective film can be easily predetermined by properly selecting the kind of the aforementioned release agent, etc. or by subjecting the aforementioned release agent or the film which has thus been subjected to release treatment to treatment for the removal (elimination) of the aforementioned metal elements or compounds thereof. In general, the thickness of the protective film is preferably from 10 to 100 μm.

The surface of the pressure-sensitive adhesive layer may keep a separator stuck thereto until the cleaning sheet is used. As the separator there may be used the same material as the protective film to be laminated on the aforementioned cleaning layer or the like, i.e., plastic film normally having a thickness of from 10 to 100 μm which has been treated for easy release with various release agents. However, unlike the protective film to be laminated on the aforementioned cleaning layer, the separator is not specifically limited in the transferred amount of the aforementioned metal elements or compounds thereof.

In the carrying material with cleaning capacity of the invention, the carrying material on which the cleaning sheet is laminated is not specifically limited. Various substrates may be used depending on the kind of the substrate processing equipment from which foreign matters are removed. In some detail, semiconductor wafer, substrate for flat panel display such as LCD and PDP, and substrate such as compact disc and MR head may be used.

In the invention, the substrate processing equipment to be cleaned is not specifically limited. Examples of the substrate processing equipment to be cleaned include exposing equipment for forming circuit, resist coating equipment, sputtering equipment, developing equipment, ashing equipment, dry etching equipment, ion implanting equipment, wafer prober, PVD equipment, CVD equipment, and examining equipment. In accordance with the invention, the aforementioned various substrate processing equipments cleaned by the aforementioned method can be provided.

EXAMPLES

The invention will be further specifically described in the following examples, but the invention should not be construed as being limited thereto. The term "parts" as used herein is meant to indicate "parts by weight".

Example 1

100 parts of an acrylic polymer (weight-average molecular weight: 700,000) obtained from a monomer mixture comprising 75 parts of 2-ethylhexyl acrylate, 20 parts of methyl acrylate and 5 parts of acrylic acid were uniformly mixed with 200 parts of polyethylene glycol 200 dimethacrylate (trade name: NK Ester 4G, produced by Shin-nakamura Chemical Corporation), 3 parts of a polyisocyanate compound (trade name: "Colonate L", produced by NIPPON POLYURETHANE INDUSTRY CO., LTD.) and 3 parts of benzyl dimethyl ketal (trade name: Irgacure 651, produced by Ciba Specialty Chemicals Inc.) as a photopolymerization initiator to prepare an ultraviolet-curing resin composition A.

Separately, into a 500 ml three-necked flask type reactor equipped with a thermometer, an agitator, a nitrogen intake pipe and a reflux condenser were charged 73 parts of 2-ethylhexyl acrylate, 10 parts of n-butyl acrylate, 15 parts of N,N-dimethylacrylamide, 5 parts of acrylic acid, and 0.15 part of 2,2'-azobisisobutyronitrile as polymerization initiator and 100 parts of ethyl acetate to make 200 g. The mixture was then stirred with nitrogen gas being introduced into the reactor for about 1 hour so that the air therein was replaced by nitrogen.

Thereafter, the internal temperature of the reactor was raised to 58° C. where the reaction mixture was then kept for about 4 hours to undergo polymerization resulting in the production of a polymer solution. To 100 parts of the polymer solution thus prepared were then mixed uniformly with 3 parts of a polyisocyanate compound (trade name: Colonate L, produced by NIPPON POLYURETHANE INDUSTRY CO., LTD.) to obtain a pressure-sensitive adhesive solution A.

The aforementioned pressure-sensitive adhesive solution was spread over the release-treated surface of a separator A made of a polyester film of continuous length (thickness: 38 µm; width: 250 mm) treated with a silicone-based release agent on one side thereof to a dry thickness of 15 µm, and then dried. A polyester film of continuous length (thickness: 25 µm; width: 250 mm) was then laminated as a base material on the pressure-sensitive adhesive layer thus formed. The aforementioned ultraviolet-curing resin composition A was then spread over the film to a thickness of 40 µm to provide a resin layer. The surface of the resin layer was then laminated with the same separator A as used above in such an arrangement that the release-treated surface of the separator A comes in contact with the resin layer to provide a laminated sheet.

The laminated sheet thus prepared was then irradiated with an ultraviolet ray having a central wavelength of 365 nm at an integrated dose of 1,000 mJ/cm$^2$ to prepare a cleaning sheet A comprising a cleaning layer made of a polymerization-cured resin layer. The separator A was then peeled off the cleaning sheet A on the cleaning layer side thereof. The cleaning sheet A was then examined for 180° peeling adhesion (according to JIS Z0237) with respect to silicon wafer (mirror surface). The result was 0.06 N/10 mm. The cleaning layer exhibited a tensile strength of 440 MPa (tensile modules: tested according to JIS K7127).

The separator A was peeled off the cleaning sheet A on the pressure-sensitive adhesive layer side thereof. The cleaning sheet A was then stuck to the mirror surface of a 8 inch silicon wafer using a hand roller to prepare a carrying material A with cleaning capacity. The aforementioned pressure-sensitive adhesive layer exhibited a 180° peeling adhesion of 1.5 N/10 mm width with respect to silicon wafer (mirror surface).

In order to examine the cleaning layer of the carrying material A with cleaning capacity for pure water extractability of ionic impurities, a sample to be measured for the content of ionic impurities was separately prepared according to the following manner. The sample thus prepared was then measured for pure water extractability.

Firstly, the ultraviolet-curing resin composition A was spread over the separator A to a thickness of 40 µm. Another separator A was then stuck to the resin layer. The laminate was then irradiated with an ultraviolet ray having a central wavelength of 365 nm at an integrated dose of 1,000 mJ/cm$^2$ so that the aforementioned resin composition A was polymerization-cured to prepare the sample to be measured for the content of ionic impurities.

Subsequently, the sample was cut into a size of 100 cm$^2$ (10 cm×10 cm). The separator A was peeled off the sample on both sides thereof, and then measured out in a PMP container. As a result, the weight of the sample was 0.375. To the sample was then added 50 ml of pure water. The container was then closed. The sample was then extracted under boiling at 120° C. for 1 hour in a dryer. The resulting extract was then subjected to quantitative analysis of ionic impurities by ion chromatography (using a Type DX-500, produced by DIONEX CORPORATION). The results were F$^-$: 0.4 ppm, Cl$^-$: 0.6 ppm, Br$^-$: 1.5 ppm, NO$_2^-$: 1.0 ppm, NO$_3^-$: 1.8 ppm, PO$_4^{3-}$: 4.0 ppm, SO$_4^{2-}$: 1.8 ppm, Na$^+$: 0.6 ppm, NH$_4^+$: 1.7 ppm, and K$^+$: 1.6 ppm.

Using a wafer prober (Type UF200, produced by TOKYO SEIMITSU CO., LTD.), which is a wafer passage testing equipment for production of semiconductor, the degree of cleaning was evaluated. Firstly, the two equipments A and B were confirmed for wafer conveyance system before cleaning. Both the equipments A and B were observed to have much visually recognizable foreign matters present on the chuck table.

Concerning the equipment A, the separator A was peeled off the carrying material A with cleaning capacity on the cleaning layer side thereof. The carrying material A was then conveyed as a dummy through the conveyance system while being in contact with the conveyance system so that the chuck table and other sites in the conveyance system were cleaned. As a result, the carrying material was successfully conveyed without having the cleaning layer to be firmly adhered to the contact sites. The conveyance system thus cleaned was then visually observed. As a result, no foreign matters were observed unremoved, demonstrating that foreign matters were surely removed through cleaning.

Subsequently, 25 sheets of product wafer were conveyed through the conveyance system thus cleaned. An actual passage test was then conducted. As a result, neither damage of product wafer nor suction error occurred, demonstrating that the substrates can be successfully processed. It was also made obvious that the product wafer thus examined is not contaminated by ionic impurities, causing neither wiring corrosion nor deterioration of transistor performance.

Comparative Example 1

An ultraviolet-curing resin composition B was prepared in the same manner as in Example 1 except that 100 parts of a urethane acrylate (trade name: U-N-01, produced by Shin-nakamura Chemical Corporation) were used instead of 200 parts of polyethylene glycol 200 dimethacrylate (trade name: NK Ester 4G, produced by Shin-nakamura Chemical Corporation) in the ultraviolet-curing resin composition A. A cleaning sheet B was prepared in the same manner as in Example 1 except that the ultraviolet-curing resin composition B was used. Using the cleaning sheet B, a carrying material B with cleaning capacity was then prepared in the same manner as in Example 1.

The separator A was then peeled off the carrying material B with cleaning capacity on the cleaning layer side thereof. The carrying material with cleaning capacity was then measured for 180° peeling adhesion (measured according to JIS Z0237) with respect to silicon wafer (mirror surface). The result was 0.02 N/10 mm. The cleaning layer exhibited a tensile strength of 880 MPa.

The cleaning layer was also measured for pure water extractability of ionic impurities (weight of sample: 0.366 g) in the same manner as in Example 1. The results were $F^-$: 0.8 ppm, $Cl^-$: 23.1 ppm, $Br^-$: 1.5 ppm, $NO_2^-$: 1.5 ppm, $NO_3^-$: 2.2 ppm, $PO_4^{3-}$: 4.5 ppm, $SO_4^{2-}$: 1.5 ppm, $Na^+$: 0.9 ppm, $NH_4^+$: 2.0 ppm, and $K^+$: 1.9 ppm.

Subsequently, using the aforementioned carrying material B with cleaning capacity, the aforementioned equipment B was conveyed as a dummy to effect cleaning. As a result, the equipment B was successfully conveyed. The conveyance system thus cleaned was then visually observed. As a result, no foreign matters were observed unremoved, demonstrating that foreign matters were surely removed through cleaning. Subsequently, 25 sheets of product wafer were conveyed through the conveyance system thus cleaned. An actual passage test was then conducted. As a result, the product wafer thus examined was observed to be contaminated by ionic impurities, causing much defectives such as wiring corrosion and deterioration of transistor performance.

Example 2

A resin composition A and a pressure-sensitive adhesive solution A were prepared in the same manner as in Example 1.

The aforementioned pressure-sensitive adhesive solution A was spread over the release-treated surface of a separator made of a polyester film of continuous length (thickness: 38 μm; width: 250 mm) treated with a silicone-based release agent on one side thereof to a dry thickness of 15 μm, and then dried. A polyester film of continuous length (thickness: 25 μm; width: 250 mm) was then laminated as a base material on the pressure-sensitive adhesive layer thus formed. The aforementioned ultraviolet-curing resin composition A was then spread over the film to a thickness of 40 μm to provide a resin layer. The surface of the resin layer was then laminated with a protective film A made of polyester film treated with a silicone-based release agent A on one side thereof in such an arrangement that the release-treated surface of the protective film A comes in contact with the resin layer to provide a laminated sheet.

The laminated sheet thus prepared was then irradiated with an ultraviolet ray having a central wavelength of 365 nm at an integrated dose of 1,000 mJ/cm² to prepare a cleaning sheet C comprising a cleaning layer made of a polymerization-cured resin layer. The protective film A was then peeled off the cleaning sheet C on the cleaning layer side thereof. The cleaning sheet C was then examined for 180° peeling adhesion (according to JIS Z0237) with respect to silicon wafer (mirror surface). The result was 0.06 N/10 mm. The cleaning layer exhibited a tensile strength of 440 MPa (tensile modules: tested according to JIS K7127).

The separator was peeled off the cleaning sheet C on the pressure-sensitive adhesive layer side thereof. The cleaning sheet C was then stuck to the mirror surface of a 8 inch silicon wafer using a hand roller to prepare a carrying material C with cleaning capacity. The aforementioned pressure-sensitive adhesive layer exhibited a 180° peeling adhesion of 1.5 N/10 mm width with respect to silicon wafer (mirror surface).

The protective film A laminated on the cleaning layer in the carrying material C with cleaning capacity was then measured for transferability of specific metal elements or compounds thereof to the surface of silicon wafer in the following manner.

Firstly, the protective film A was brought into contact with (the mirror surface of) silicon wafer with a hand roller, and then allowed to stand at 23° C. for 1 minute. Subsequently, the surface of silicon wafer with which the protective film A had been brought into contact was measured for transferability of Ca, Mg, Al, Ti, Cr, Mn, Fe, Co, Ni, Cu and Zn by total reflection X-ray fluorometry (using a Type TREX610T, produced by Technos Inc.). The surface of the silicon wafer which had been brought into contact with the protective film was then brought into contact with hydrofluoric acid. The hydrofluoric acid with which the wafer had been brought into contact was heated and evaporated to dryness. The residue was then subjected to inductively coupled plasma mass spectroscopy (using a Type HP4500, produced by Hewlett-Packard Development Company, L.P.) to measure the transferability of Na and K. The measurements of transferability were as follows.

Na: $5.6 \times 10^{10}$ atoms/cm²
K: $2.3 \times 10^{10}$ atoms/cm²
Ca: $4.1 \times 10^{10}$ atoms/cm²
Mg: $6.3 \times 10^{9}$ atoms/cm²
Al: $8.2 \times 10^{9}$ atoms/cm²
Ti: $1.3 \times 10^{11}$ atoms/cm²
Cr: $4.1 \times 10^{9}$ atoms/cm²
Mn: $2.3 \times 10^{10}$ atoms/cm²
Fe: $2.2 \times 10^{11}$ atoms/cm²
Co: $3.5 \times 10^{9}$ atoms/cm²
Ni: $6.7 \times 10^{9}$ atoms/cm²
Cu: $4.8 \times 10^{9}$ atoms/cm²
Zn: $7.5 \times 10^{9}$ atoms/cm²

Using a laser surface detector, two sheets of fresh 8 inch silicon wafer were observed for the occurrence of foreign matters having a size of not smaller than 0.2 μm on the mirror surface thereof. As a result, the two sheets of wafer were found to have 10 and 3 pieces of foreign matter, respectively. These silicon wafers were then conveyed into separate oxide layer dry etching equipments equipped with an electrostatic attraction mechanism with its mirror surface facing downward. Using the laser surface detector, these silicon wafers were each observed for the occurrence of foreign matters having a size of not smaller than 0.2 μm on the mirror surface thereof. As a result, the two sheets of wafer were found to have 38,945 and 37,998 pieces of foreign matter, respectively.

The carrying material C with cleaning capacity was then conveyed into the oxide layer drying etching equipment having the wafer stage to which 38,945 foreign matters had been attached with the protective film A peeled off the cleaning layer. As a result, the carrying material C with cleaning capacity was successfully conveyed. This procedure was performed five times. Thereafter, a fresh 8 inch silicon wafer was conveyed into the equipment with its mirror surface facing downward. The silicon wafer was then observed for the occurrence of foreign matters having a size of not smaller than 0.2 μm using a laser surface detector. As a result, it was found that foreign matters had been removed by 95% of the initial value. Thereafter, product wafer was processed. As a result, it was found that product wafer can be successfully prepared without being contaminated by metal impurities.

Comparative Example 2

A cleaning sheet D was prepared in the same manner as in Example 2 except that a protective film B made of a polyester film treated with a silicone-based release agent B on one side thereof was used instead of the protective film A to be provided on the cleaning layer. A carrying material D with cleaning capacity was then prepared from the cleaning sheet D in the same manner as in Example 2.

The protective film B was then measured for the transferability of specific metal elements or compounds thereof to the surface of silicon wafer in the same manner as mentioned above. The results were as follows.

Na: $1.4 \times 10^{12}$ atoms/cm$^2$
K: $3.3 \times 10^{12}$ atoms/cm$^2$
Ca: $3.4 \times 10^{12}$ atoms/cm$^2$
Mg: $4.3 \times 10^{12}$ atoms/cm$^2$
Al: $1.2 \times 10^{13}$ atoms/cm$^2$
Ti: $2.1 \times 10^{12}$ atoms/cm$^2$
Cr: $3.2 \times 10^{13}$ atoms/cm$^2$
Mn: $5.3 \times 10^{11}$ atoms/cm$^2$
Fe: $1.2 \times 10^{12}$ atoms/cm$^2$
Co: $4.5 \times 10^{11}$ atoms/cm$^2$
Ni: $8.7 \times 10^{11}$ atoms/cm$^2$
Cu: $6.8 \times 10^{12}$ atoms/cm$^2$
Zn: $7.1 \times 10^{12}$ atoms/cm$^2$ The carrying material D with cleaning capacity was then conveyed into the oxide layer drying etching equipment having the wafer stage to which 37,998 foreign matters had been attached with the protective film B peeled off the cleaning layer. As a result, the carrying material D with cleaning capacity was successfully conveyed. This procedure was performed five times. Thereafter, a fresh 8 inch silicon wafer was conveyed into the equipment with its mirror surface facing downward. The silicon wafer was then observed for the occurrence of foreign matters having a size of not smaller than 0.2 μm using a laser surface detector. As a result, it was found that foreign matters had been removed by 90% of the initial value. However, when product wafer was processed, the resulting product wafer was contaminated because the equipment had been contaminated by metal impurities. Thus, defectives due to deterioration of device performance occurred frequently. Accordingly, in order to remove metal contaminants from the equipment, much labor was required such as procedure which comprises suspension of operation of the equipment followed by opening and cleaning.

Example 3

A resin composition A and a pressure-sensitive adhesive solution A were prepared in the same manner as in Example 1.

The aforementioned pressure-sensitive adhesive solution A was spread over the release-treated surface of a separator B made of a polyester film of continuous length (thickness: 38 μm; width: 250 mm) treated with a silicone-based release agent on one side thereof to a dry thickness of 15 μm, and then dried. A polyester film of continuous length (thickness: 25 μm; width: 250 mm) was then laminated as a base material on the pressure-sensitive adhesive layer thus formed. The aforementioned ultraviolet-curing resin composition A was then spread over the film to a thickness of 40 μm to provide a resin layer. The surface of the resin layer was then laminated with the same separator B as used above in such an arrangement that the release-treated surface of the separator B comes in contact with the resin layer to provide a laminated sheet.

The laminated sheet thus prepared was then irradiated with an ultraviolet ray having a central wavelength of 365 nm at an integrated dose of 1,000 mJ/cm$^2$ to prepare a cleaning sheet E comprising a cleaning layer made of a polymerization-cured resin layer. The separator B was then peeled off the cleaning sheet E on the cleaning layer side thereof. The cleaning sheet E was then examined for 180° peeling adhesion (according to JIS Z0237) with respect to silicon wafer (mirror surface) The result was 0.06 N/10 mm. The cleaning layer exhibited a tensile strength of 440 MPa (tensile modules: tested according to JIS K7127).

The separator B was peeled off the cleaning sheet E on the pressure-sensitive adhesive layer side thereof. The cleaning sheet E was then stuck to the mirror surface of a 8 inch silicon wafer using a hand roller to prepare a carrying material E with cleaning capacity. The aforementioned pressure-sensitive adhesive layer exhibited a 180° peeling adhesion of 1.5 N/10 mm width with respect to silicon wafer (mirror surface).

In order to examine the cleaning layer of the carrying material E with cleaning capacity for the content of metal impurities, a sample to be measured for the content of metal impurities was separately prepared according to the following manner. The sample thus prepared was then measured for the content of metal impurities.

Firstly, the ultraviolet-curing resin composition A was spread over the separator B to a thickness of 40 μm. Another separator B was then stuck to the resin layer. The laminate was then irradiated with an ultraviolet ray having a central wavelength of 365 nm at an integrated dose of 1,000 mJ/cm$^2$ so that the aforementioned resin composition A was polymerization-cured to prepare the sample to be measured for the content of metal impurities.

Subsequently, the sample was cut into a size of 4 cm$^2$ (2 cm×2 cm). The separator B was then peeled off the sample on both sides thereof. The sample was measured out in a platinum dish where it was then heated with a gas burner so that it was combusted.

Thereafter, the sample was heated to 550° C. for 1 hour and to 600° C. for 1 hour in an electric oven until no carbon was left uncombusted. The sample was then allowed to cool. To the sample was then added 2 ml of concentrated hydrochloric acid. The sample was then heated to 50° C. The resulting ash content was then dissolved. The solution was allowed to cool, and then diluted with ultrapure water to make 50 ml. For the determination of the content of Na and K, atomic-absorption spectroscopy was effected (using a Type Z-6100, produced by Hitachi, Ltd.). For the determination of the content of Mg, Al, Ca, Ti, Cr, Mn, Fe, Co, Ni, Cu and Zn, ICP spectroscopy was effected (using a Type SPS-1700HVR, produced by Seiko Instruments Inc.).

The results were Na: 0.9 ppm, K: 0.5 ppm, Mg: 0.1 ppm, Al: 0.2 ppm, Ca: 0.2 ppm, Ti: 0.1 ppm, Cr: 0.1 ppm, Mn: 0.1 ppm, Fe: 0.1 ppm, Co: 0.1 ppm, Ni: 0.1 ppm, Cu: 0.1 ppm, and Zn: 0.8 ppm.

Using a laser surface detector, two sheets of fresh 8 inch silicon wafer were observed for the occurrence of foreign matters having a size of not smaller than 0.2 µm on the mirror surface thereof. As a result, the two sheets of wafer were found to have 5 and 5 pieces of foreign matter, respectively. These silicon wafers were then conveyed into separate oxide layer dry etching equipments equipped with an electrostatic attraction mechanism with its mirror surface facing downward. Using the laser surface detector, these silicon wafers were each observed for the occurrence of foreign matters having a size of not smaller than 0.2 µm on the mirror surface thereof. As a result, the two sheets of wafer were found to have 30,576 and 31,563 pieces of foreign matter, respectively, on the area of 8 inch wafer size.

The carrying material E with cleaning capacity was then conveyed into the oxide layer drying etching equipment having the wafer stage to which 30,576 foreign matters had been attached with the separator B peeled off the cleaning layer. As a result, the carrying material E with cleaning capacity was successfully conveyed. This procedure was performed five times. Thereafter, a fresh 8 inch silicon wafer was conveyed into the oxide layer etching equipment with its mirror surface facing downward. The silicon wafer was then observed for the occurrence of foreign matters having a size of not smaller than 0.2 µm using a laser surface detector. As a result, it was found that foreign matters had been removed by 90% of the initial value.

Thereafter, product wafer was processed. As a result, it was found that product wafer can be successfully prepared without being contaminated by metal impurities.

Comparative Example 3

An ultraviolet-curing resin composition C was prepared in the same manner as in Example 3 except that 100 parts of an acrylic polymer ("Rheocoat R-1020", produced by Toray Coatex Co., Ltd.) were used instead of 100 parts of the acrylic polymer A to be incorporated in the ultraviolet-curing resin composition A and 3 parts of a thioxanthone-based photopolymerization initiator ("KAYACURE DETX-S", produced by NIPPON KAYAKU CO., LTD.) were used instead of 3 parts of benzyl dimethyl ketal as a photopolymerization initiator.

A cleaning sheet F was prepared in the same manner as in Example 3 except that the ultraviolet-curing resin composition C was used. Using the cleaning sheet F, a carrying material F with cleaning capacity was then prepared in the same manner as in Example 3.

The separator B was then peeled off the carrying material F with cleaning capacity on the cleaning layer side thereof. The carrying material F with cleaning capacity was then measured for 180° peeling adhesion (measured according to JIS Z0237) with respect to silicon wafer (mirror surface). The result was 0.07 N/10 mm. The cleaning layer exhibited a tensile strength of 420 MPa.

In order to examine the content of metal impurities in the cleaning layer, a sample to be measured for the content of metal impurities was prepared in the same manner as in Example 3. The sample was then measured for the content of metal impurities. The results were Na: 7.1 ppm, K: 6.5 ppm, Mg: 5.2 ppm, Al: 5.8 ppm, Ca: 5.1 ppm, Ti: 5.0 ppm, Cr: 6.1 ppm, Mn: 5.0 ppm, Fe: 5.1 ppm, Co: 5.7 ppm, Ni: 5.3 ppm, Cu: 7.0 ppm, and Zn: 7.3 ppm.

The carrying material F with cleaning capacity was then conveyed into the oxide layer drying etching equipment having the wafer stage to which 31,563 foreign matters had been attached with the separator B peeled off the cleaning layer. As a result, the carrying material F with cleaning capacity was successfully conveyed. This procedure was performed five times. Thereafter, a fresh 8 inch silicon wafer was conveyed into the equipment with its mirror surface facing downward. The silicon wafer was then observed for the occurrence of foreign matters having a size of not smaller than 0.2 µm using a laser surface detector. As a result, it was found that foreign matters had been removed by 88% of the initial value.

However, when product wafer was processed, the resulting product wafer was contaminated because the equipment had been contaminated by metal impurities. Thus, defectives due to deterioration of device performance occurred frequently. Accordingly, in order to remove metal contaminants from the equipment, much labor was required such as procedure which comprises suspension of operation of the equipment followed by opening and cleaning.

While the invention has been described in detail and with reference to specific embodiments thereof, it will be apparent to one skilled in the art that various changes and modifications can be made therein without departing from the spirit and scope thereof.

The present application is based on Japanese Patent Application (Patent Application 2002-340935), filed on Nov. 25, 2002, Japanese Patent Application (Patent Application 2002-340936), filed on Nov. 25, 2002, and Japanese Patent Application (Patent Application 2003-018151), filed on Jan. 28, 2003, the disclosure of which are hereby incorporated by reference.

INDUSTRIAL APPLICABILITY

In accordance with the invention, the predetermination of the pure water extractability of ionic impurities $F^-$, $Cl^-$, $Br^-$, $NO_2^-$, $NO_3^-$, $PO_4^{3-}$, $SO_4^{2-}$, $Na^+$, $NH_4^+$ and $K^+$ from the cleaning layer (extracted under boiling at 120° C. for 1 hour) to be not greater than 20 ppm in the removal of foreign matters attached to the interior of the substrate processing equipment through cleaning by the conveyance into the equipment makes it possible to provide a cleaning member having a high utility which causes no contamination of the equipment by ionic impurities. Further, in accordance with the invention, the use of a protective film formed by a material from which specific metal elements or compounds thereof are transferred to a silicon wafer each in an amount of not greater than a specific value as calculated in terms of metal element when the protective film is brought into contact with (the mirror surface of) the silicon wafer as a protective film provided on the cleaning layer in the removal of foreign matters attached to the interior of the substrate processing equipment through cleaning by the conveyance of the cleaning member into the interior of the equipment makes it possible to provide a cleaning member having a high utility which causes little contamination of the equipment by metal impurities attributed to the protective film. Moreover, in accordance with the invention, the predetermination of the content of various metal elements Na, K, Mg, Al, Ca, Ti, Cr, Mn, Fe, Co, Ni, Cu and Zn and compound thereof in the cleaning layer to be not greater than 5 ppm (µg/g) as calculated in terms of metal element in the removal of foreign matters attached to the interior of the substrate processing equipment through cleaning by the conveyance of the cleaning member into the interior of the equipment makes it possible to provide a cleaning member having a high utility which causes no contamination of the equipment by metal impurities.

The invention of claimed is:

1. A cleaning sheet comprising a cleaning layer having pure water extractability of $F^-$, $Cl^-$, $Br^-$, $NO_2^-$, $NO_3^-$, $PO_4^{3-}$, $SO_4^{2-}$, $Na^+$, $NH_4^+$ and $K^+$ each in an amount of not greater than 20 ppm, whereby the cleaning layer is extracted under boiling for 1 hour;
   wherein the cleaning layer is provided on one side of a base material and a pressure-sensitive adhesive layer is provided on the other side of the base material; and
   wherein the pressure-sensitive adhesive layer comprises a material mainly composed of an acrylic polymer comprising polymer having a weight-average molecular weight of not greater than 100,000 in a range of greater than zero, and no greater than 10% by weight.

2. A method for cleaning a substrate processing equipment which comprises conveying a cleaning sheet defined in claim 1 into a substrate processing equipment.

3. The cleaning sheet as claimed in claim 1, wherein the cleaning layer has a 180° peeling adhesion of 0.01 to 0.1 N/10 mm width with respect to silicon wafer (mirror surface).

4. A cleaning sheet comprising a releasable protective film laminated on a cleaning layer, wherein the releasable protective film is formed by a material from which metal elements of Na, K, Ca, Mg, Al, Ti, Cr, Mn, Fe, Co, Ni, Cu and Zn or compounds thereof are transferred to a silicon wafer each in an amount of not greater than $1\times10^{12}$ atoms/cm$^2$ as calculated in terms of metal element when the releasable protective film is brought into contact with a mirror surface of the silicon wafer at 23° C. for 1 minute;
   wherein the cleaning layer is provided on one side of a base material and a pressure-sensitive adhesive layer is provided on the other side of the base material; and
   wherein the pressure-sensitive adhesive layer comprises a material mainly composed of an acrylic polymer comprising polymer having a weight-average molecular weight of not greater than 100,000 in a range of greater than zero, and in a proportion of no greater than 10% by weight.

5. A carrying material with cleaning capacity comprising a cleaning sheet defined in claim 4 laminated on a carrying material with a pressure-sensitive adhesive layer.

6. A method for cleaning a substrate processing equipment which comprises conveying a carrying material with cleaning capacity defined in claim 5 into a substrate processing equipment.

7. A method for cleaning a substrate processing equipment which comprises conveying a cleaning sheet defined in claim 4 into a substrate processing equipment with the releasable protective film peeled off the cleaning layer.

8. The cleaning sheet as claimed in claim 4, wherein the cleaning layer has a 180° peeling adhesion of 0.01 to 0.1 N/10 mm width with respect to silicon wafer (mirror surface).

9. A cleaning sheet comprising a cleaning layer containing metal elements of Na, K, Mg, Al, Ca, Ti, Cr, Mn, Fe, Co, Ni, Cu and Zn or compounds thereof each in an amount of not greater than 5 ppm (μg/g) as calculated in terms of metal element;
   wherein the cleaning layer is provided on one side of a base material and a pressure-sensitive adhesive layer is provided on the other side of the base material; and
   wherein the pressure-sensitive adhesive layer comprises a material mainly composed of an acrylic polymer comprising a polymer having a weight-average molecular weight of not greater than 100,000 in a range of greater than zero, and no greater than 10% by weight.

10. The cleaning sheet as claimed in any one of claims 1 to 9, wherein the cleaning layer has substantially no adhesion.

11. A carrying material with cleaning capacity comprising a cleaning sheet defined in claim 1 or 9 laminated on a carrying material with a pressure-sensitive adhesive layer.

12. A method for cleaning a substrate processing equipment which comprises conveying a carrying material with cleaning capacity defined in claim 11 into a substrate processing equipment with the releasable protective film peeled off the cleaning layer.

13. A method for cleaning a substrate processing equipment which comprises conveying a cleaning sheet defined in claim 9 into a substrate processing equipment.

14. The cleaning sheet as claimed in claim 9, wherein the cleaning layer has a 180° peeling adhesion of 0.01 to 0.1 N/10 mm width with respect to silicon wafer (mirror surface).

* * * * *